Reissued Jan. 24, 1933 Re. 18,718

UNITED STATES PATENT OFFICE

EUGEN SCHLIERER, OF ESSLINGEN-ON-THE-NECKAR, GERMANY, ASSIGNOR TO THE FIRM: MERKEL & KIENLIN G. M. B. H., OF ESSLINGEN-ON-THE-NECKAR, GERMANY

METHOD OF IMPREGNATING WOOL

No Drawing. Original No. 1,846,908, dated February 23, 1932, Serial No. 414,216, filed December 14, 1929, and in Germany December 13, 1928. Application for reissue filed May 11, 1932. Serial No. 610,701.

My invention relates to a method of impregnating wool fibre, to wit, wool in its initial condition, or wool yarn, but not to the impregnation of finished knitted goods. If finished goods are impregnated the spaces between the fibres will become clogged, and the finished goods will be partly deprived of their heat-insulating properties.

It is an object of my invention to impregnate wool in such manner as not to interfere with the heat-insulating properties of the wool.

To this end I treat the wool fibre or yarn with a saponaceous watery emulsion of oil or fat and thereupon with a solution of aluminium formate $Al(CO_2H)_3$, and dry the wool at temperatures at 60°–80° C.

It has already been suggested to impregnate cotton so as to render it water-repellent. However, the methods as suggested heretofore are not suitable for treating wool, as the impregnation interferes with its heat-insulating properties and impregnated garments or the like of wool are not better than cotton articles as to their heat-insulating properties.

According to my invention this drawback of the old methods is eliminated by treating the wool as described herein.

In reducing my method to practice, I may treat 10 kilogrammes of wool yarn in an emulsion containing 5 grammes of soap and 10 grammes of olive oil in one litre of water. After having been treated with this emulsion for a short time, the yarn is placed in a solution containing 30 grammes of aluminium formate in one litre of water, moved several times through the solution, and is then dried at 70 degs. centigrade, the temperature range of the drying being preferably 60°–80° C.

The impregnation effected in this manner is permanent and is not interfered with by repeated immersion in water nor by the usual cleaning, of the impregnated articles.

The substances suitable for use in my invention consist of oleaginous materials, capable of forming a saponaceous emulsion and selected from a class consisting of fats and oils.

Various changes may be made in the details disclosed in the foregoing specification without departing from the invention or sacrificing the advantages thereof.

I claim:—

1. The method of impregnating wool fibre comprising treating the wool with a saponaceous watery emulsion of oil, containing 5 grammes of soap, and 10 grammes of olive oil, in one litre of water, then treating it with a solution of aluminium formate, and drying at 60–80°.

2. The method of impregnating wool fibre comprising treating the wool with a saponaceous watery emulsion of oil, containing 5 grammes of soap, and 10 grammes of olive oil, in one litre of water, then treating it with a solution of aluminium formate, containing 30 grammes of aluminium formate in one litre of water, and drying at 60–80°.

3. The method of impregnating wool yarn comprising treating the wool with a saponaceous aqueous emulsion of an oleaginous material capable of forming a saponaceous emulsion and selected from a class consisting of fats and oils, then treating it with an aqueous solution of aluminum formate and drying at temperatures of about 60° to 80° C.

In testimony whereof I affix my signature.

EUGEN SCHLIERER.